United States Patent
Koakutsu et al.

(10) Patent No.: US 6,906,812 B2
(45) Date of Patent: *Jun. 14, 2005

(54) SYMBOL PRINTER, SYMBOL PRINTING METHOD, SYMBOL PRINTER DRIVER, AND A DATA STORAGE MEDIUM STORING A SYMBOL PRINTING PROGRAM

(75) Inventors: Naohiko Koakutsu, Shiojiri (JP); Teisuke Takei, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 792 days.

This patent is subject to a terminal disclaimer.

(21) Appl. No.: 09/808,164

(22) Filed: Mar. 13, 2001

(65) Prior Publication Data

US 2001/0035971 A1 Nov. 1, 2001

(30) Foreign Application Priority Data

Apr. 14, 2000 (JP) ........................................ 2000-114041
Mar. 12, 2001 (JP) ........................................ 2001-069335

(51) Int. Cl.$^7$ .............................................. G06K 15/00
(52) U.S. Cl. ........................ 358/1.13; 358/1.2; 358/1.11
(58) Field of Search ................................ 358/1.13, 1.2, 358/1.11, 1.1, 1.15, 470

(56) References Cited

U.S. PATENT DOCUMENTS 5,222,818 A 6/1993 Akiyama et al.
5,361,329 A * 11/1994 Morita et al. ................ 358/1.2

FOREIGN PATENT DOCUMENTS

| EP | 0 575 989 A2 | 12/1993 | |
|----|----|----|----|
| EP | 0 743 614 | 11/1996 | |
| EP | 851373 A2 * | 7/1998 | ........... G06K/5/00 |
| EP | 0 851 373 | 7/1998 | |
| JP | 6-64280 | 3/1994 | |
| JP | 9-99590 | 4/1997 | |
| JP | 3036508 | 9/1998 | |
| JP | 10-230663 | 9/1998 | |
| JP | 11-203379 | 7/1999 | |

* cited by examiner

*Primary Examiner*—Arthur G. Evans
(74) *Attorney, Agent, or Firm*—Michael T. Gabrik

(57) ABSTRACT

A bar code or similar symbol can be printed accurately within a specified printing area by a printer for printing such symbols. The printer has a symbol image generator for converting display data to a symbol and has hardware or software for reporting the size of the converted symbol to a host device. The host sends specific commands and text data for representation in the printed symbol to the printer for printing. As a result, the host can confirm whether printing within the specific area is possible.

38 Claims, 11 Drawing Sheets

| COMMAND CODE | PARAMETERS | FUNCTION |
|---|---|---|
| XXX1 | a1a2 | SPECIFIES NUMBER OF COLUMNS (ROW LENGTH) OF PDF417 SYMBOL |
| XXX2 | b1b2 | SPECIFIES NUMBER OF ROWS IN PDF417 SYMBOL |
| XXX3 | c1c2 | SPECIFIES PDF417 SYMBOL MODULE WIDTH |
| XXX4 | d1d2 | SPECIFIES PDF417 SYMBOL ROW HEIGHT |
| XXX5 | e | SPECIFIES PDF417 SYMBOL ERROR CORRECTION LEVEL |
| XXX6 | f | SETS PDF417 SYMBOL OPTIONS |
| XXX7 | g1-gn | STORES RECEIVED DATA TO DISPLAY DATA STORAGE |
| XXX8 | - | PRINTS DISPLAY DATA STORED TO DISPLAY DATA STORAGE AS A SYMBOL |
| XXX9 | - | TRANSMITS THE SYMBOL SIZE FOR THE STORED DISPLAY DATA IF PRINTED AS A SYMBOL |

FIG. 3

SYMBOL PRINTER, SYMBOL PRINTING METHOD, SYMBOL PRINTER DRIVER, AND A DATA STORAGE MEDIUM STORING A SYMBOL PRINTING PROGRAM

BACKGROUND OF THE INVENTION

1. Field of the Invention

The present invention relates to a printer and a printer driver for printing symbols containing specific information. Typical of such symbols are one-dimensional bar codes and two-dimensional codes. There are two general types of two-dimensional codes: "stacked" or "multi-row" codes in which plural one-dimensional bar codes are stacked in vertical alignment, and matrix codes. Matrix codes set the intersections of a code matrix to black or white to encode information, and thus differ fundamentally from conventional one-dimensional bar codes. The present invention primarily relates to a printer and to a printer driver for printing two-dimensional codes.

It should be noted that the term "symbol" as used herein refers to the one-dimensional bar code or two-dimensional code that is printed. In addition, the information (content) that the symbol encodes and represents is referred to as the "display data."

2. Description of the Related Art

One-dimensional bar codes are one of today's most commonly used symbols. They are typically used to encode a product number and other information, and are readily found on products sold at retail.

Two-dimensional codes, however, have grown in use because of their ability to encode significantly more information. One-dimensional bar codes, for example, contain one line of information presented in a vertical or horizontal sequence. A stacked two-dimensional code, on the other hand, contains plural, vertically-aligned rows of one-dimensional bar codes, and matrix codes encode information by setting the intersections of the code matrix to black or white (on or off) according to specific rules.

Code 49, Code 16K, PDF417, SuperCode, and Ultracode are examples of stacked two-dimensional codes. VeriCode, Data Matrix (ECC000-140, ECC200, and others), CP Code, MaxiCode, Code 1, QR Code, QR Code Model II, and Aztec Code are examples of two-dimensional matrix codes. Features common to two-dimensional codes include (1) the ability to display (encode) significantly more data compared with one-dimensional bar codes, (2) omnidirectional reading (the reading direction is not restricted), (3) the ability to encode binary information, and (4) improved reading accuracy and security (data error detection and correction).

A typical one-dimensional bar code uses a combination of bars and spaces (the intervals between bars) to display particular information (the display data). The bar code can be read using a bar code scanner to restore the information to a human-readable form. Printing a bar code therefore requires the to-be-displayed information to first be converted to a bar code pattern, which the printer then prints. This is also the case with matrix symbols. That is, to display particular information with a combination of black and white pixels in a matrix symbol, the information to be displayed (the display data) must first be converted to the matrix code pattern, i.e., the symbol, which the printer then prints.

To encode information to a symbol for printing, the display data must be first converted to a specific code according to a specific symbol protocol and then printed. It is important to note that conversion to a two-dimensional code symbol involves more than a simple code conversion. More specifically, code conversion requires, for example, adding a start code and stop code before and after the display data, including error correction code, data compression, and other steps defined by the specific protocol for the type of symbol used. The coding process used for two-dimensional codes is therefore complex because of not only the large amount of information that can be displayed, but also due to the compression and error correction coding operations that are required.

Conventionally these symbols are generated by an application running on a host computer performing a process for converting the display data to the bit pattern of the symbol (simply called "symbol bit pattern" below), and then sending the resulting bit pattern to a printer as the print data. The symbol is then printed. Symbols can thus be printed with the printer performing a normal printing process, that is, simply printing the bit pattern data received from the host computer.

As noted above, the process for converting display data to the symbol that will actually be printed requires converting the display data and other processes that are selectively applied based on the specific type of symbol. For example, data compression and error correction code (ECC) generation are also required to generate a PDF417 symbol, one type of two-dimensional code. Furthermore, the PDF417 protocol allows three different user-selectable data compression modes, and nine (0 to 8) user-selectable ECC levels.

The size (height and width dimensions) of the printed symbol therefore varies according to the specific content and amount of data to be encoded in the symbol because of the plural compression modes and nine different ECC levels that can be used. This means that the size of the final printed symbol is not known until the bit pattern is actually generated.

Print data, including symbols such as those described above, must usually fit within a defined printing area or print frame. However, the size of the two-dimensional code symbol to be printed may not be known until the actual bit pattern is generated for printing. Furthermore, the size of the printed symbol differs according to the printer resolution even if the bit pattern data is the same. Thus, there is a need to be able to confirm before printing begins whether the generated symbol can be printed within the defined print area.

SUMMARY AND OBJECTS OF THE INVENTION

It is therefore an object of the present invention to provide a printer and a printer driver that are able to confirm before symbol printing whether the symbol containing the display data can be printed within a defined print area.

Thus, in accordance with one aspect of the invention, a printer capable of printing symbols according to the present invention is provided. The printer comprises a first storage area for storing display data from which a symbol to be printed is generated; a symbol image generator for converting the stored display data to a specific symbol structure format, and generating from that format bit pattern information representing the symbol to be printed; a second storage area for storing the bit pattern information; a calculator for calculating a horizontal symbol size and vertical symbol size of the symbol from the bit pattern information of the symbol; a size information transmitter for sending the calculated horizontal and vertical symbol sizes to a host device as symbol size information; and print controller for controlling printing of the bit pattern information of the symbol to be printed based on the symbol size information.

The first storage area stores received display data in ASCII code, for example. The symbol image generator then converts this data to a bit pattern of the symbol to be ultimately printed. The resulting bit pattern is stored in the second storage area, which is preferably a print buffer or other type of storage linked to the printing mechanism.

As a result, when display data is received, the printer converts that data to the specific type of symbol and is then able to print it. The host device, or an application program running on the host device, therefore only needs to send the information to be displayed to the printer. Application development is thus made significantly easier. In addition, the host can confirm the size of the symbol before printing starts because the printer sends the symbol size to the host in response to a request from the host.

The symbol image generator preferably comprises a code converter for converting the display data to a code pattern according to a protocol of the symbol, and generating the specific symbol structure format; and a pattern generator for generating the bit pattern of the symbol to be printed based on the specific symbol structure format. In other words, because there are various types of symbols that could be printed, the code converter converts the data to the type of symbol character selected for printing, and the pattern generator then converts this symbol character to a bit pattern of the actual symbol to be printed.

Preferably, the code converter, in converting the display data to a code pattern, compresses the encoded data, and generates an error correction code. If a PDF417 symbol is to be printed, for example, various data compression modes and error correction levels can be used. The printer can therefore be designed so that a desired error correction level can be selected.

Preferably, the size information transmitter compares the size of the symbol to be printed with a specified printing area, and sends the resulting comparison data to the host device. The host can therefore confirm whether the symbol can be printed in the specified printing area before printing begins. If the symbol will not fit, for example, the printing area (print frame) can be changed, the height and length of the symbol can be changed, the module width can be changed, or other operation can be performed as appropriate so that the symbol can be printed in the allotted print frame.

Preferably, the size information transmitter transmits the calculated symbol size information or the comparison data in response to a size information send request from the host device, and the print controller starts symbol printing when a print request is received from the host. It is therefore possible when an appropriate command is received from the host to first confirm the symbol size and start printing only when printing within the defined print area is possible.

Preferably, the symbol image generator generates a symbol image when a print command or size information send command is received from the host device. For example, when a size information send command is received, the symbol image generator generates the actual symbol in working memory to confirm the size of the actual print image.

A printer according to the present invention can print stacked two-dimensional barcodes, including PDF417, SuperCode, and UltraCode symbologies, and matrix codes, including VeriCode, Data Matrix, and MaxiCode symbologies. While a printer capable of printing one-dimensional bar codes is also included within the technical scope of the invention, the preferred embodiments are directed particularly towards two-dimensional code symbologies such as noted above. In addition, the printer can be designed to selectively print any of these symbols.

Another aspect of the present invention involves a symbol printing method that comprises the steps of (a) receiving display data; (b) storing the received display data; (c) generating a specific code and format representing a symbol to be printed based on the received display data; (d) generating bit pattern information from the generated specific code; (e) transmitting to the host device in response to a request from the host device horizontal and vertical size information for the symbol to be printed; and (f) printing the bit pattern information of the symbol based on the horizontal and vertical size information.

These steps can be accomplished, for example, by a printing mechanism capable of printing in dot units, a CPU, and memory, and a device having a program for controlling these components. These functions can also be achieved by a hard wired logic device.

In this case step (c) preferably comprises (c1) converting the received display data to a symbol code, compressing coded display data, and generating an error correction code.

Preferably, step (e) comprises (e1) comparing the size of the symbol to be printed with a specified printing area, and sending the resulting comparison data to the host device.

Preferably, steps (c) to (e) are performed in response to a size information send request from the host device, and preferably, steps (c) to (f) are performed in response to a print request from the host device.

The symbol printing method of this invention can further print stacked two-dimensional codes, including PDF417, SuperCode, and UltraCode symbologies, and matrix codes, including VeriCode, Data Matrix, and MaxiCode symbologies. Furthermore, this printing method can print any one of these symbols, or can select from among these the symbol type to print.

In another aspect of the invention, a program embodied on a machine-readable storage medium for controlling the above symbol printing method is provided. It is therefore possible to print various types of symbols in accordance with the above-described symbol printing method by loading such a program into a printer that is equipped with a printing mechanism, CPU, and memory.

According to another aspect of the invention, a printer driver, operably positioned between an application program running on a host device and a printer connected to the host device, controls the printer based on a request from the application program. This printer driver comprises means for receiving display data from the application program; symbol image generating means for generating from the received display data a specific format representing a symbol to be printed, and converting the specific format to bit pattern information representing the symbol; means for calculating a horizontal symbol size and vertical symbol size from the bit pattern information; size information transmission means for sending the calculated horizontal and vertical symbol sizes to the application program as symbol size information; and print data transmission means for sending to the printer the bit pattern information to be printed in the form of a symbol based on the symbol size information.

The printer driver in this case is preferably an OPOS object having a first control object (CO) that provides an interface to the application program, and a second service object (SO) that the first object with an interface to the printer.

The first object preferably comprises the receiving means and size information transmission means, and the second object comprises the symbol image generating means, calculating means, and print data transmission means.

The various functions of the printer driver may be achieved by a program that is embodied on a machine-readable storage medium.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings in which like parts are designated by like reference numerals:

FIG. 3 is a table of exemplary symbol printing control commands, and corresponding content, that can be sent from a host computer to the symbol printer;

DESCRIPTION OF THE PREFERRED EMBODIMENTS

The preferred embodiments of the present invention are described below with reference to the accompanying figures. It will be noted that the following embodiments are described as exemplary of the present invention and shall not limit the scope of the following claims. From the description that follows, taken together with the drawings, those skilled in the related art will recognize that other embodiments in which all or part of the elements of the invention described below are replaced by an equivalent are also be possible. Such embodiments are part of the invention to the extent that they fall within the scope of the claims. In addition, while the present invention is described herein with reference to a PDF417 symbol, a stacked two-dimensional code that is growing in use, such description is by way of example only. The present invention can be used for printing any type of symbol or two-dimensional code.

Figures 11A, 11B:
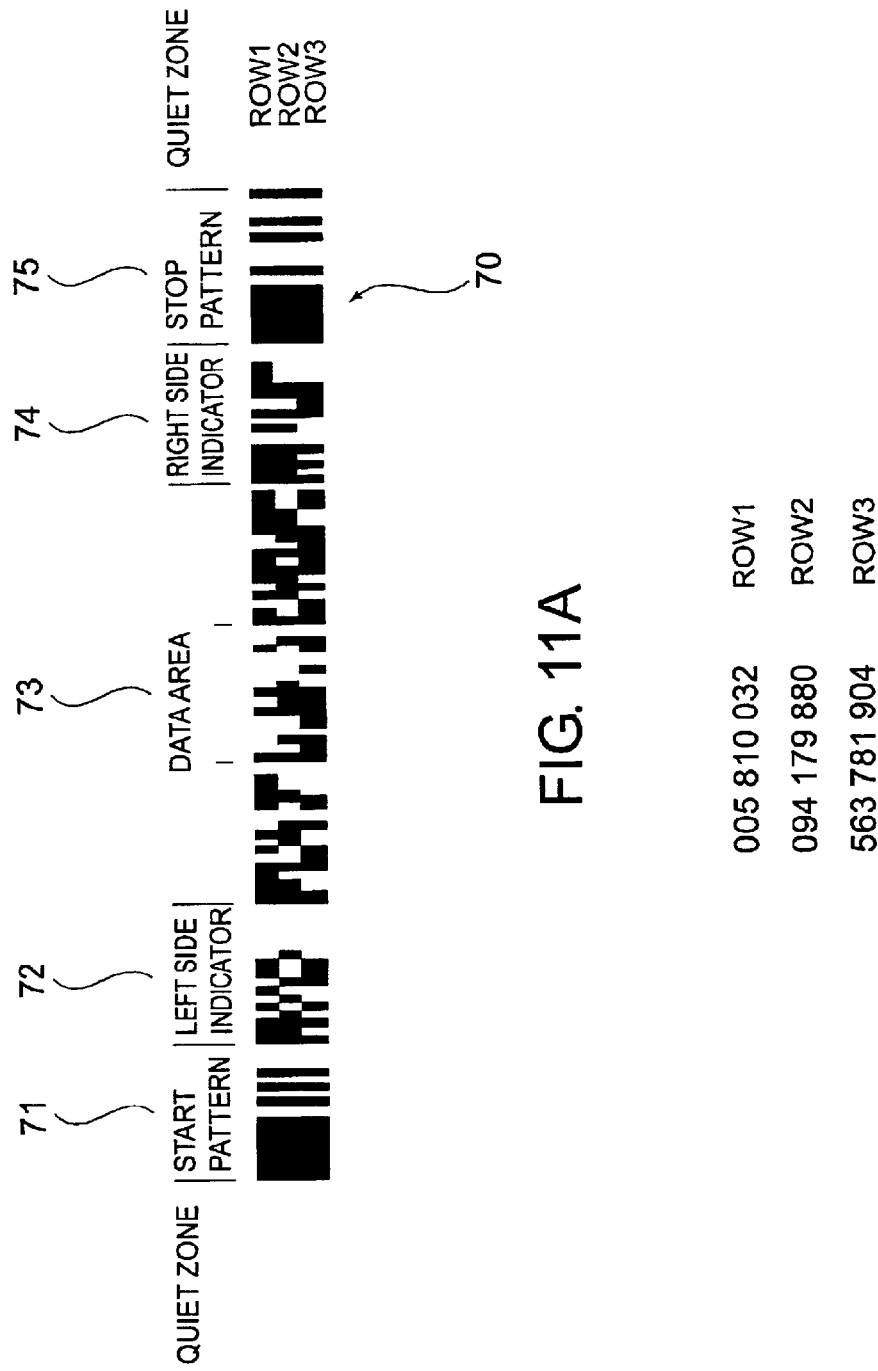
FIG. 11A shows a PDF417 symbol and format.
FIG. 11B shows the normal decimal representation of the display data encoded in the data area of the PDF417 symbol.

As noted above, PDF417 is a stacked two-dimensional code. A PDF417 symbol consists of a stack of vertically aligned bar code rows. Each PDF417 symbol has at least three rows and can have up to 90 rows, and can contain a maximum 1850 text characters, 2710 digits, or 1108 bytes of binary data per symbol. A typical PDF417 symbol and structure are shown in FIG. 11A. The PDF417 symbol shown in FIG. 11A has three bar code rows. The basic parameters of a PDF417 symbol are described below to assist in understanding the following description of the operation of the present invention.

There is a quiet zone on each of the four sides of a PDF417 symbol, that is, the top, bottom, right, and left sides. As shown in FIG. 11A, each row contains a leading quiet zone, a start pattern 71, a left row (side) indicator column 72, symbol characters (or "codewords") containing the encoded information and other data 73, a right row (side) indicator column 74, a stop pattern 75, and a trailing quiet zone. The codewords, that is, the numeric value of the symbol characters shown in FIG. 11A, are shown in FIG. 11B. In this example the codewords in row 1 contain the values 005 810 032, in row 2 contain the values 094 179 880, and in row 3 contain the values 563 781 904.

To generate a PDF417 symbol for printing, the data (display data) to be encoded in the symbol is processed according to the PDF417 protocol to generate codewords. These processes include compression, error correction coding, and adding formatting codewords (such as the start and stop patterns).

Figure 12:
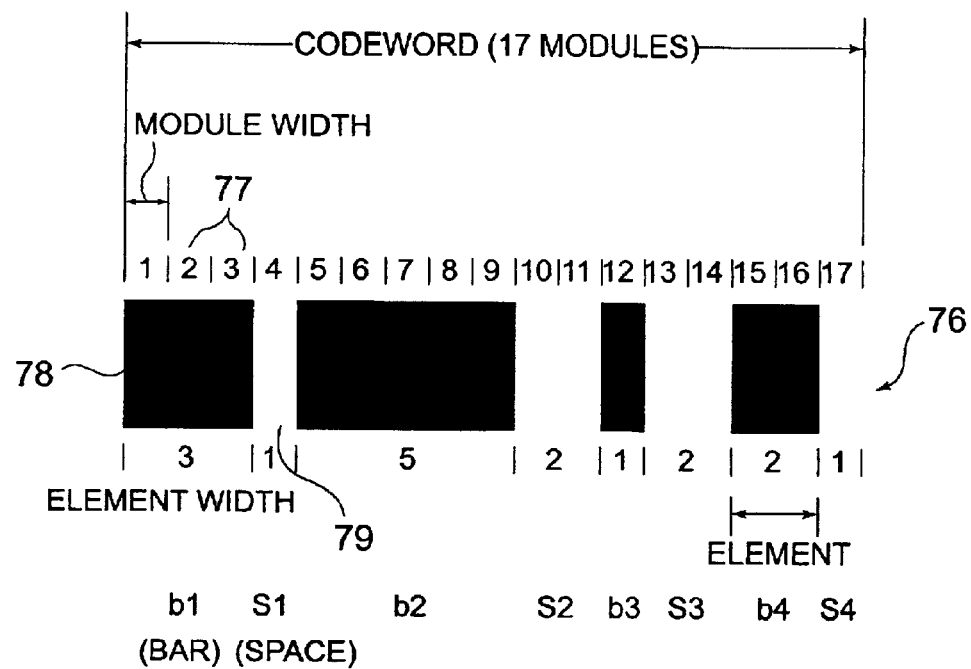
FIG. 12 shows the format of a PDF417 code word.

The codeword sequence is shown in FIG. 12. Each codeword contains four black bars 78 and four spaces 79 (i.e., eight "elements") and a total of 17 modules. The "module" defines the narrowest width of a bar or space in a PDF417 bar code. In a PDF417 symbol all bars or spaces are multiples of up to six times this width. Module width is user definable. It is therefore possible to adjust the overall size of the symbol by controlling the module width.

The PDF417 protocol allows between 1 and 30 codewords per row and from 3 to 90 rows. It is therefore possible to adjust the aspect ratio of the PDF417 symbol to the shape of the printing area. This means that, assuming a PDF417 symbol containing the same content, the symbol aspect ratio can be changed, that is, the height and width changed, so that the symbol can be printed in the specified printing area.

The PDF417 protocol also allows for data compression and the addition of error correction code. There are three data compression modes: text compression, byte compression, and numeric compression. Nine error correction levels, levels 0 to 8, are also allowed for different security levels.

A complex process is therefore required to convert the desired display data to the symbol that is actually printed.

Figure 1:
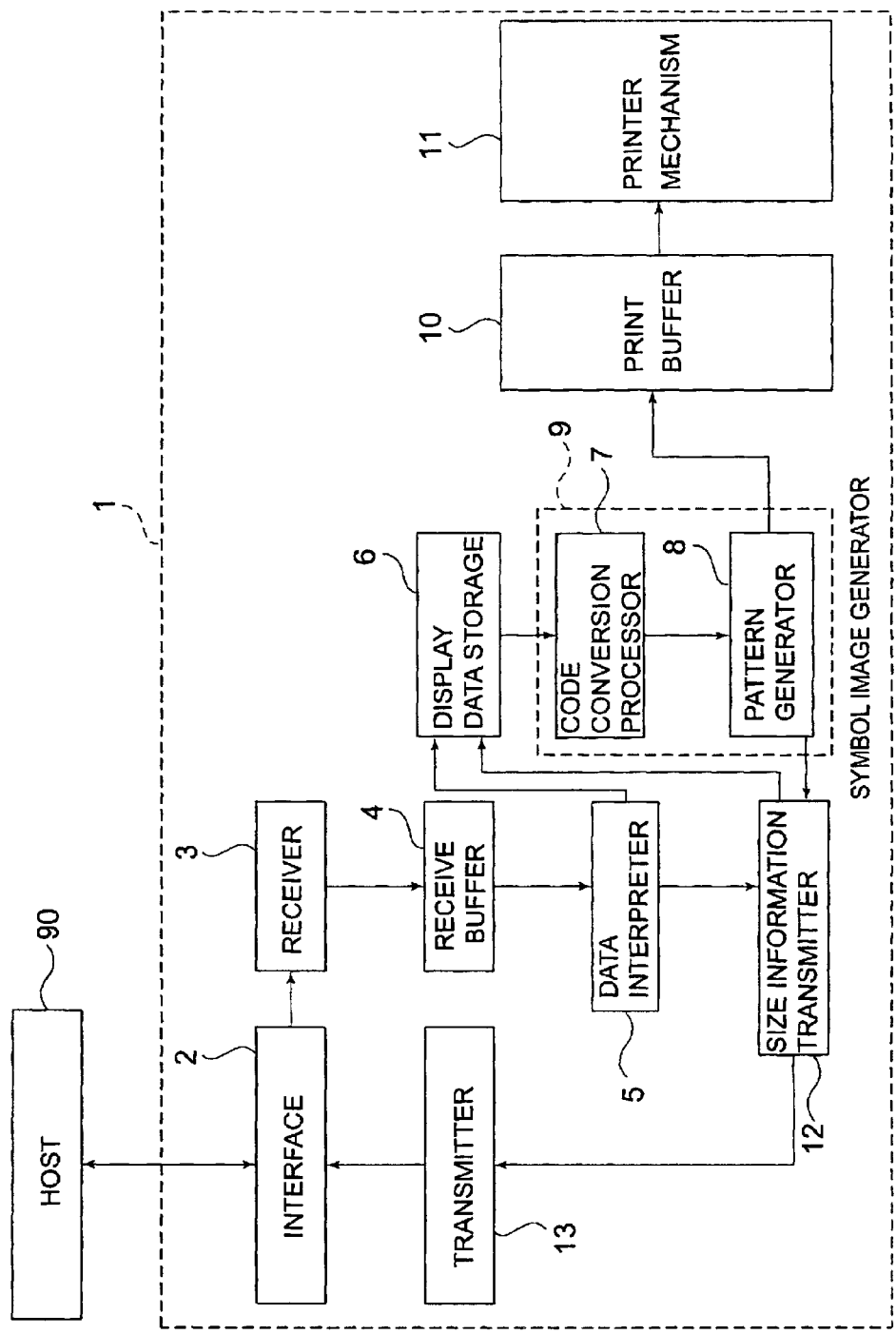
FIG. 1 is a functional block diagram of a printer according to a first preferred embodiment of the present invention.

FIG. 1 is a functional block diagram of a printer according to a first preferred embodiment of the present invention. This printer 1 is connected to a host 90 through an interface 2. Data sent from the host 90 is received through the interface 2 by the receiver 3 and stored in a receive buffer 4. Data stored in the receive buffer 4 is then interpreted by a data interpreter 5 in the order received.

If the received data is display data to be printed as a symbol, the display data is stored in a display data storage 6. Data stored in the display data storage 6 is then converted to the bit pattern of a symbol by a symbol image generator 9 that comprises a code conversion processor 7 and pattern generator 8.

The display data is first converted by the code conversion processor 7 to a code pattern according to the protocol of the symbol to be displayed. This conversion to a code pattern does more than simply convert the display data 1:1 to codewords. More specifically, code pattern conversion includes data compression and error correction coding, and formatting with the specific start and stop patterns and right and left indicators, for example.

The symbol data converted to a codeword of a specific format is then converted by pattern generator 8 to the bit pattern of the symbol to be printed. The symbol bit pattern is then stored in a print buffer 10. Symbols stored in the print buffer 10 are printed by the printer mechanism 11.

Printing symbols as described above can be controlled by commands from the host. Note that the display data and the printing of a corresponding symbol are linked in the operation described above such that a symbol is printed by sending the display data. Various commands can be provided, including a command for sending the display data, a command requesting that the host be notified of the size of the symbol generated for the transmitted display data, and a command for printing previously transmitted display data.

Assume, for example, that the host device instructs the printer to report the symbol size. The command sent from host 90 is interpreted by data interpreter 5. When the data interpreter 5 detects a symbol size report command, the data interpreter 5 causes the data stored in the display data storage 6 to be transmitted to symbol image generator 9, and at the same time sets the size information transmitter 12 to an active state. The size information transmitter 12 thus obtains the symbol size information from the symbol image data generated by the symbol image generator 9, and sends the size data to the host 90 by way of transmitter 13 through interface 2.

Figure 2:
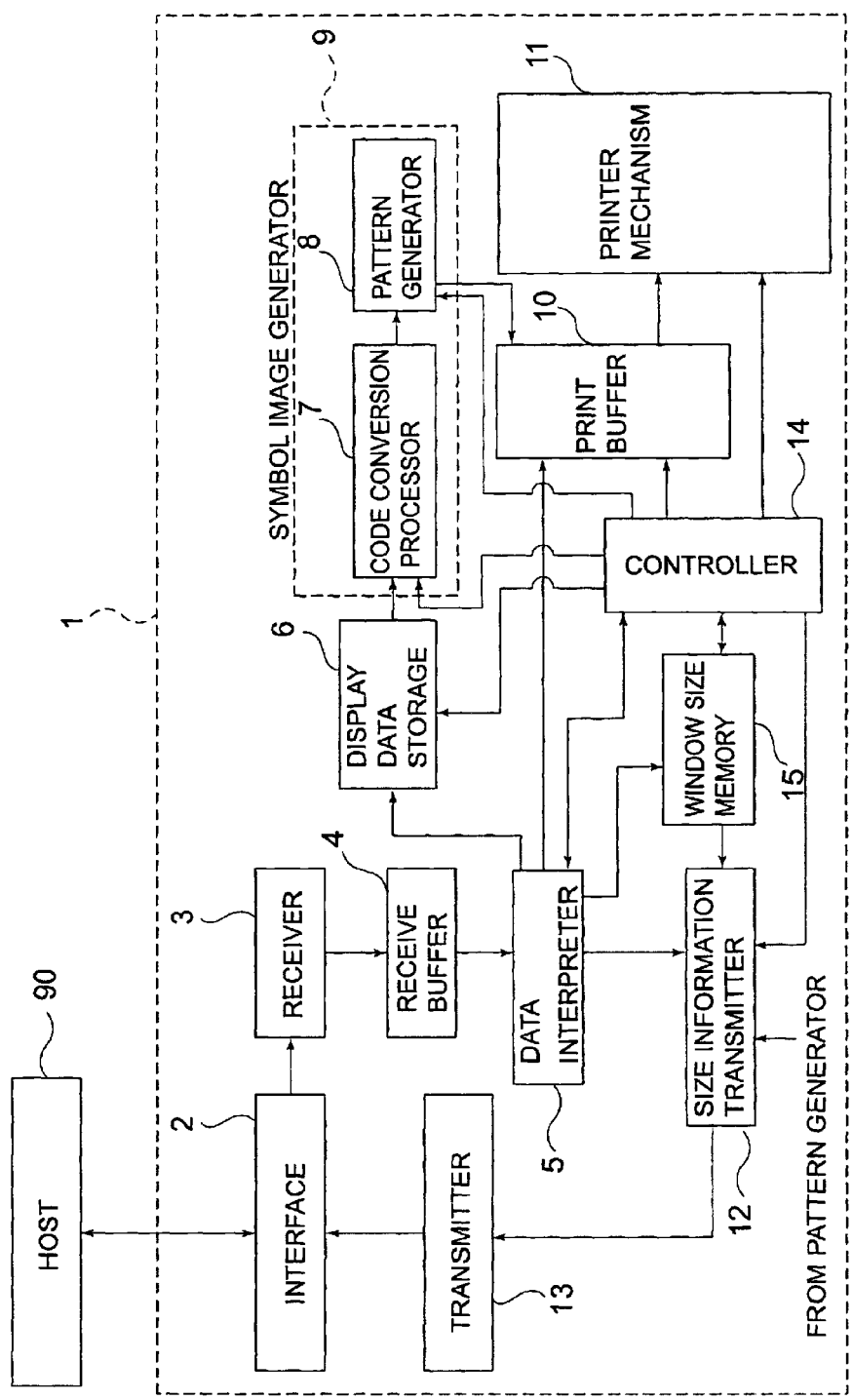
FIG. 2 is a functional block diagram of a printer according to a second preferred embodiment of the present invention.

FIG. 2 is a functional block diagram of a printer according to a second preferred embodiment of the present invention. A printer according to this embodiment differs from the one described above in the addition of a window size memory 15 and a controller 14. A printer according to this embodiment can perform the same processes run by the printer of the first embodiment, but can also provide additional functionality.

The controller 14 controls overall printer operation, and is a means for running processes corresponding to various commands by integrally linking operation of various printer parts.

The window size memory 15 is a means for storing the print frame, that is, the area in which the symbol is printed. The print frame is set by the host 90 and sent to the printer 1 where the window size memory 15 stores the size of the print frame. If a print frame setting is not set by the host, a specific size can be automatically set based on a preset print frame setting.

A symbol must be printed within the defined print frame. As noted above, however, the actual print size of a two-dimensional code symbol may not be known until the actual bit pattern for the printed symbol is generated because of data compression and error correction code added to the data. There are, therefore, cases when it is necessary to confirm whether the symbol can be printed within the defined print frame before symbol printing starts. Whether printing within the print frame is possible can be confirmed using a confirmation command. When a confirmation command is received, interpreted by the data interpreter 5, and thus recognized as a confirmation command, the size information transmitter 12 is notified.

The size information transmitter 12 thus obtains the print frame information from window size memory 15, compares it with the symbol data from the pattern generator 8 to determine whether the symbol can be printed in the print frame, and sends the result of this comparison to the host 90. The host 90 can thus know if the symbol can be printed in the print frame. If printing within the print frame is not possible, the host 90 can change the length and height of the symbol, or change the module width, so that the symbol can be printed within the print frame.

Exemplary symbol printing control commands that can be sent from the host are shown in FIG. 3. The function of such commands shown in FIG. 3, the command codes, and parameter specifications are shown by way of example only, and functions, codes, and parameters other than those shown can be used. Plural functions can also be built in to a single command. These commands are interpreted by the data interpreter 5, and a process corresponding to a particular command is executed by co-operation of various parts under the control of the controller 14. The commands shown in FIG. 3 are described in detail below.

(a) Command XXX1 defines in parameter a1 a2 the number of columns across the width of a PDF417 symbol. A PDF417 symbol can have a maximum 30 data columns. The horizontal length of the data area 73 in a PDF417 symbol is the number of columns times the width of one codeword. Codeword width can be calculated from the current module width.

(b) Command XXX2 defines in parameter b1 b2 the number of rows in the symbol. A PDF417 symbol has at least 3 and at most 90 rows. The vertical height of the data area 73 is thus the height of one row times the number of rows. The total number of codewords in the data area 73 equals the number of data columns times the number of rows.

(c) Command XXX3 defines the module width in parameter c1 c2. The unit used to specify the module width is typically the printer resolution (dots).

(d) Command XXX4 defines the height of each codeword in parameter d1 d2. Codeword height is typically based on the module width and specified as the parameter d1$d2$ multiple of the module width.

(e) Command XXX5 specifies error correction level 0 to 8 in parameter e. There are nine error correction levels (in powers of 2), differing by the number of error correction codewords. For example, at error correction level 0, there are two ($2^1$=2) error correction codewords. At error correction level 8 there are 512 ($2^9$=512) error correction codewords.

(f) Command XXX6 sets the PDF417 symbology options in parameter f. Options include, for example, specifying a simple PDF417 symbol. A simple PDF417 symbol differs from the PDF417 symbol shown in FIG. 11A in that the right side indicator 74 and stop pattern 75 are omitted so that the codeword count is reduced. The drawback to a simple PDF417 symbol is that it can only be read in one direction and a degree of freedom in the reading direction is therefore sacrificed.

(g) Command XXX7 stores the display data specified in parameters g1 to gn in the display data storage 6.

(h) Command XXX8 prints the display data stored in the display data storage 6 as a symbol (that is, prints the data after encoding the stored display data). It should be noted that printing is not executed when the size of the symbol is greater than the size of the print frame.

(i) Command XXX9 sends to the host 90 the size of the display data stored in the display data storage 6 when the display data is displayed as a symbol, that is, sends the size of the symbol generated by encoding the stored display data. This size information includes both the horizontal and vertical sizes (referred to as the X-dimension and Y-dimension in PDF417) of the symbol, and whether the symbol can be printed within the print frame. The horizontal and vertical sizes can be expressed in dot units (the minimum pitch of the printer mechanism 11), metric, or other unit of measurement.

It should be noted that the printer 1 can also be set to automatically process the column and row counts of the symbol so that the symbol will fit within the print frame. For example, the printer could be instructed to automatically process the symbol by setting parameters a1 a2 and b1 b2 of respective commands XXX1 and XXX2 to 0.

Figure 4:
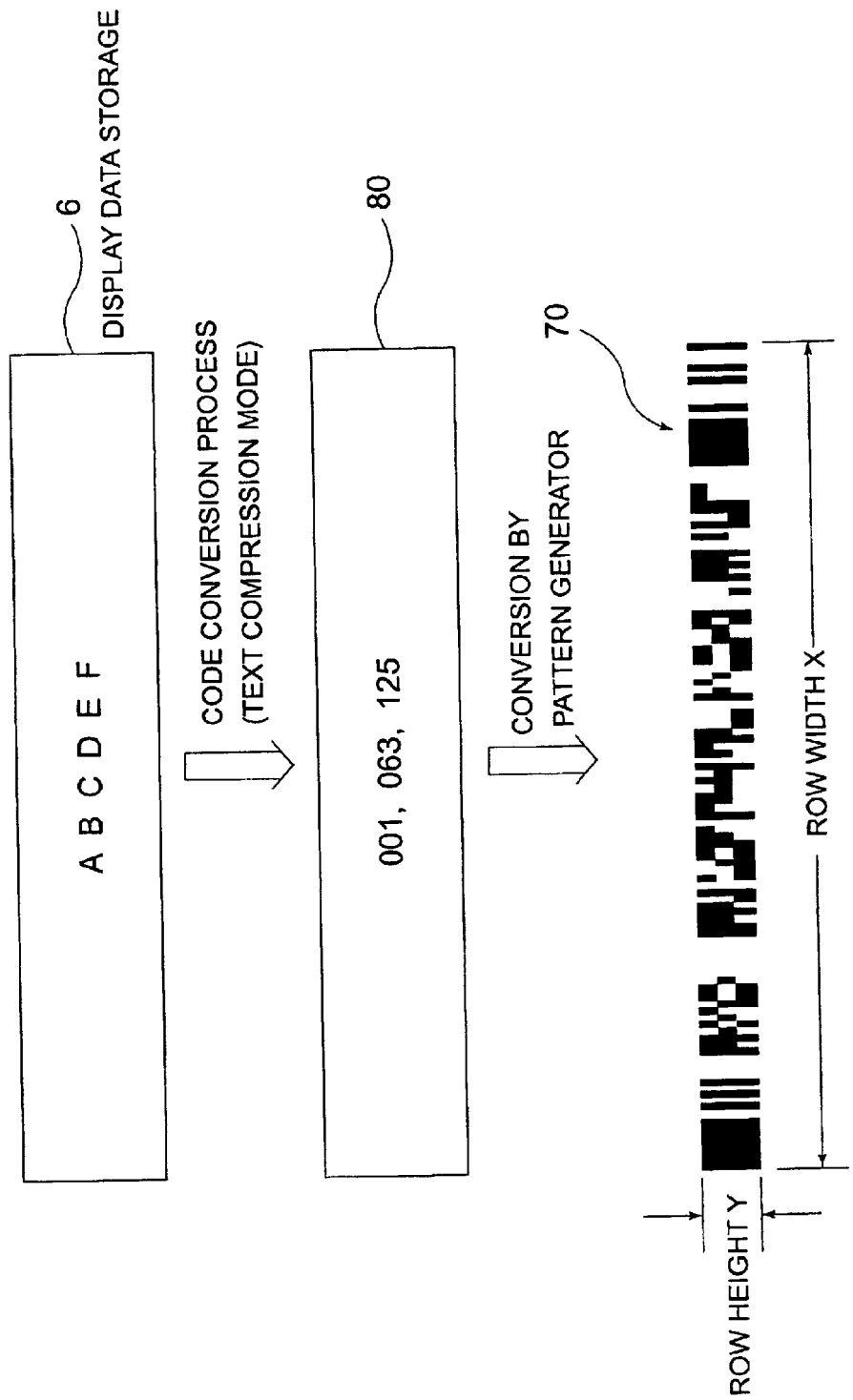
FIG. 4 shows the process for converting display data to a symbol for symbol printing.
Figure 5:
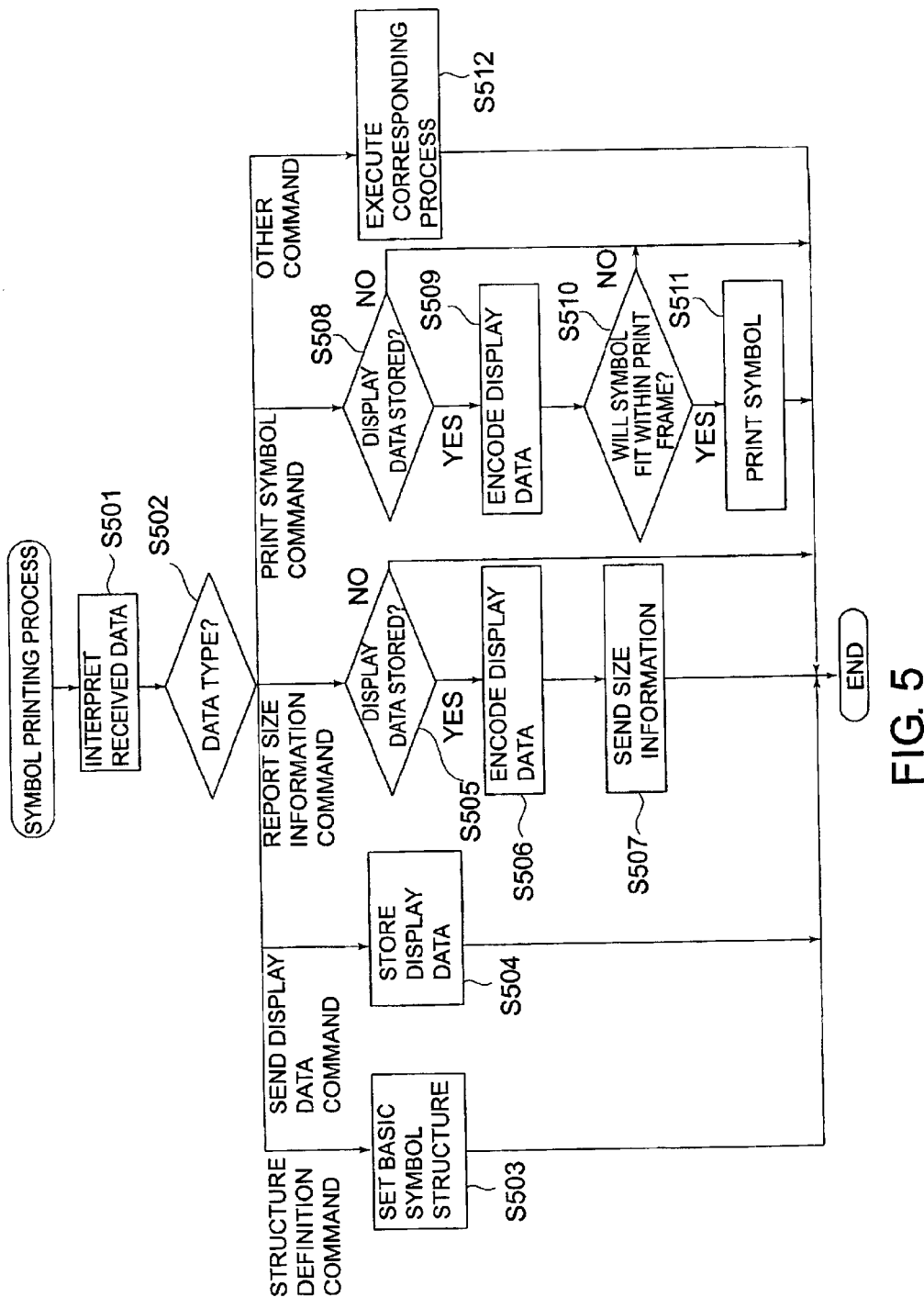
FIG. 5 is a flow chart of a symbol printing process using a printer according to the present invention.

A process for printing a PDF417 symbol 70 as shown in FIG. 11 is described next below with reference to FIGS. 4 and 5. FIG. 4 shows the conversion from display data to symbol image for printing a symbol, and FIG. 5 is a flow chart of the printing process.

The printing process starts with the data interpreter 5 of the printer 1 reading and interpreting the data stored to the receive buffer 4 in FIFO (first-in first-out) order (step S501). In step S502 the type of the received data is detected. If the received data is detected in step S502 as a structure definition command (commands XXX1 to XXX6 above) defining the basic structure (that is, the number of data columns, number of rows, module width, row height, error correction level, and options) of the symbol 70, the symbol structure is set according to the parameters of the received commands (step S503). The settings of the structure definition command are stored in a specific storage area in the printer 1, such as in the controller 14 or in the code conversion processor 7. The printer can be comprised so that once these settings are stored, they are retained and used for subsequent symbol printing operations unless specifically changed. In addition, specific preset values can be used to define the symbol structure if the structure settings are not specified by the host 90. It is assumed in this exemplary embodiment that the number of data columns in the printed symbol is set to 3, the number of rows is set to 3, and the module width is set to a specific value.

Once the basic symbol structure is set, display data for the symbol 70 is sent from the host 90. It is further assumed in this embodiment that the host 90 sends the display data ABCDEF (in ASCII code) with the command XXX7 to printer 1. When the printer 1 receives the display data and data interpreter 5 determines command XXX7 was received (step S502 detects a send display data command), the data following the command is stored in display data storage 6 as the display data (step S504). The display data can be sent from the host 90 in ASCII code, or it can be converted by the printer to ASCII code.

FIG. 4 shows the conversion of the ASCII code display data stored in display data storage 6 to codewords 80, and the conversion of the resulting codewords to a bit pattern image (symbol) 70.

When the host 90 sends command XXX9 instructing the printer to report the symbol size information (step S502 detects a report size information command), the printer 1 detects whether the display data is stored in the display data storage 6 (step S505). If it is (step S505 returns yes), code conversion processor 7 converts the display data to codewords by compressing the display data and generating error correction code, then adds the start and stop patterns and left and right indicator characters, and thus generates a complete codeword block 80. The pattern generator 8 then converts this codeword block 80 to a bit pattern image of the PDF417 symbol 70 to be printed (step S506).

Note that FIG. 4 shows only the codeword values 001, 063, 125 of the codeword block 80 obtained by converting the ASCII code for ABCDEF in the text compression mode, and does not show the start pattern, stop pattern, or indicator characters. The PDF417 protocol is followed in this example to convert from ASCII code to PDF417 codewords. The conversion protocol is, however, not important here and therefore only the converted codeword values are shown.

Although there are only three codewords, 001, 063, and 125, in this example, it should be noted that the final bit pattern image still has three data columns and is three rows high. This is because PDF417 codewords must be at least three rows high, and, because the symbol structure in this example is set to three data columns. Vertical and horizontal error correction codewords and padding codewords are therefore inserted in addition to the display data codewords.

The size information transmitter 12 then compares the horizontal dimension X and the vertical dimension Y of the symbol 70 with the specified print frame (window) size stored in the window size memory 15. The result of this comparison, horizontal dimension X, and vertical dimension Y are then sent to the host 90 (step S507).

If the host 90 then sends command XXX8 to request symbol printing (step S502 detects a print symbol command), printer 1 checks whether display data is stored in the display data storage 6 (step S508). If it is (step S508 returns yes), the display data is converted to a bit pattern image (step S509). The size of symbol 70 is then compared with the specified print frame, and if the symbol 70 can be printed within the print frame (step S510 returns yes), the symbol is printed (step S511).

If the received command is some other command (step S502 detects a command other than those described above), the process corresponding to that command is executed (step S512).

If the display data is not stored in the display data storage 6 in steps S505 or S508, and if the symbol size exceeds the print frame in step S510, a corresponding error message can be sent to the host.

Figure 6:
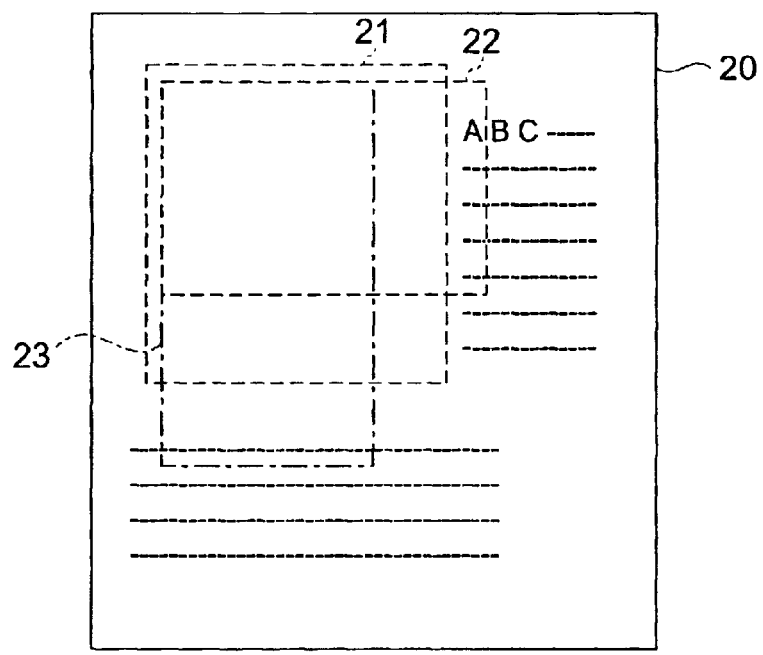
FIG. 6 shows a print sample in which the size of the symbol is greater than a defined print area.
Figure 7:
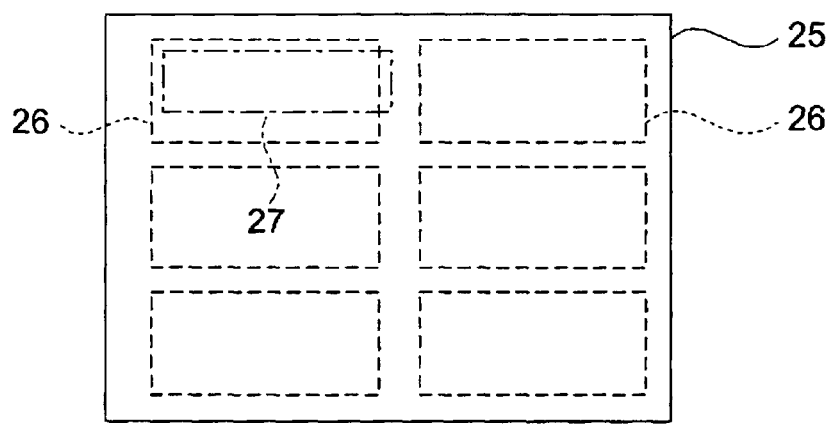
FIG. 7 shows printing a bar code type symbol to a label.

The relationship between the print frame and symbol size is shown in FIG. 6 and FIG. 7. FIG. 6 shows a case in which printing frame 21 is set at the top left portion of page 20. If the symbol to be printed is horizontally too long, as indicated by print image outline 22, the right end of the printed image 22 will overlap the text to the right side of the printing frame 21. This makes it difficult to read both the symbol and the text to the right of the symbol print frame. As shown by print image outline 23, the symbol can be also be too tall relative to the printing frame 21. In this case the bottom end of the symbol 23 will overlap text printed below the printing frame 21. The same problem occurs again, that is, it is difficult to read the symbol as well as the text below the symbol print frame.

If symbol height or width exceeds that of the printing frame 21 but there is space remaining within the printing frame (e.g., if the symbol is taller but also narrower than the print frame), the aspect ratio of the symbol can be changed so that the symbol fits inside the printing frame. In the case of a too-wide symbol 22, for example, the number of columns can be reduced and the number of rows increased, thus making the symbol narrower and taller. Similarly, to print a too-tall symbol 23, the number of rows can be reduced and the number of columns increased so that the symbol fits in the printing frame.

There are also cases in which the symbol cannot be printed within the printing frame even after reshaping the symbol by adjusting the row and column counts. In such cases the overall size of the symbol can be reduced by making the module, that is, the smallest unit of the symbol character, smaller.

By thus determining in advance of symbol printing whether the symbol can be printed within the printing frame, the shape of the symbol can be changed so that the symbol will fit within the printing frame. To accomplish this, however, it is necessary to know the shape of the symbol to be printed before starting to print the symbol. As described above, this size information can be obtained from the printer 1 in this preferred embodiment by means of command XXX9. A software application running on the host uses the size information obtained from the printer 1 to check the symbol size and modify the symbol as necessary, by changing the symbol aspect ratio or modifying the display data, for example, so that the symbol will fit within the printing frame.

Changing the symbol size is accomplished using commands XXX1 to XXX6 above to change the symbol structure settings of the printer 1. The application program could alternatively change the printing frame definition rather than changing the symbol size.

FIG. 7 shows printing a symbol such as a bar code to a label 26. Label paper 25 usually contains plural labels 26. The labels 26 have an adhesive backing so that after the symbol is printed, the label 26 can be peeled from the label paper 25 and applied to a product or other item. It is therefore particularly important that the symbol be printed accurately on the specific label 26.

Figure 8:
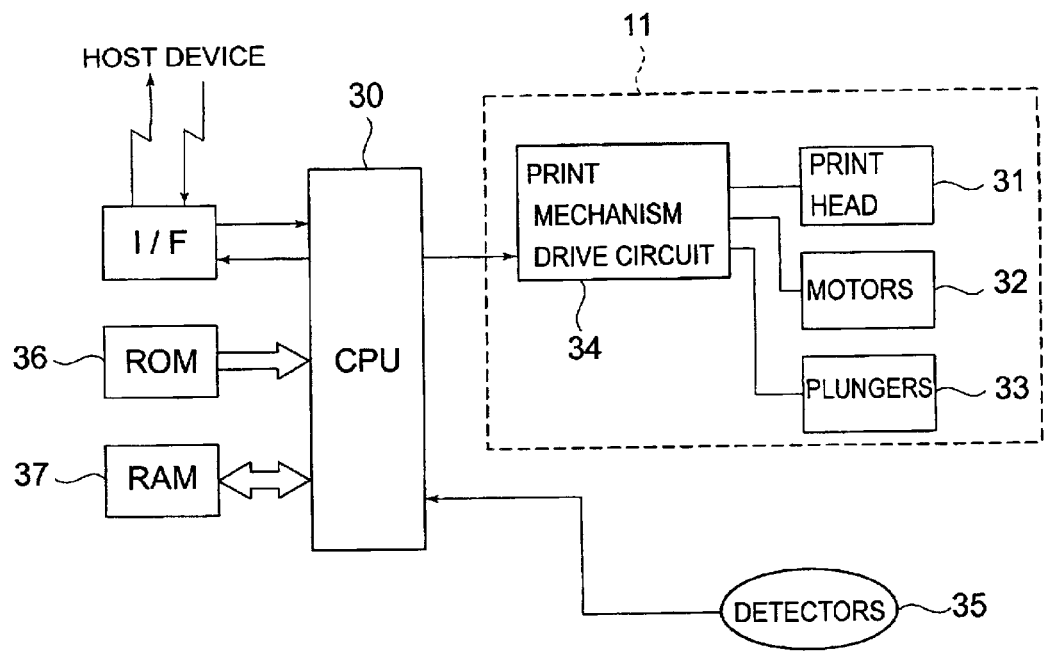
FIG. 8 is a functional block diagram of a typical configuration for achieving, in a CPU and ROM or RAM, the control and storage structure and function of FIGS. 1 and 2.

FIG. 8 is a block diagram of a typical configuration for achieving, in a central processing unit (CPU) 30 and memory, such as RAM 37 and ROM 36, the various control parts and storage shown in FIGS. 1 or 2.

The print head 31, motors 32, and plungers 33, as well as print mechanism drive circuit 34 for driving these components, constitute the printer mechanism 11 whereby various physical operations, including transporting the print paper, printing, and cutting the paper, are performed in conjunction with symbol printing. Various detectors 35 are also connected to the CPU 30, including a paper cutting error sensor, paper jam detector and other error state detectors, a cover open sensor, remaining ink sensor, and paper position sensor. Detection results are input from these sensors to the CPU.

Data and software (which may include firmware) containing a program for storing the above-described display data, converting data to a symbol, sending the symbol size information, and accomplishing other functions and processes can be stored to ROM 36 and RAM 37, and read therefrom by CPU 30 to achieve these various functions. The software for accomplishing these processes is recorded on a machine-readable storage medium. A computer can therefore read the software from the storage medium to control the printer, and thus achieve a printer and printing method according to the present invention.

By using a CPU, memory, and printing mechanism to achieve the present invention as described above, symbol conversion processes can be easily accomplished, and a desired symbol can be selected from plural symbols for printing.

The present invention can also be applied to a driver for controlling a printer. An exemplary printer driver is described below using OPOS (OLE for Retail POS) by way of example.

OPOS is an international standard defining a standardized interface for POS (point-of-sale) system devices, such as printers and displays. OPOS standard objects (drivers) provide the application developer with API (application programming interface) functions that simplify application development using OLE (Object Linking and Embedding) control, which is supported by the Windows® operating system commonly used for POS system host devices. An OPOS standard object is referred to below as simply an OPOS object.

Figure 9:
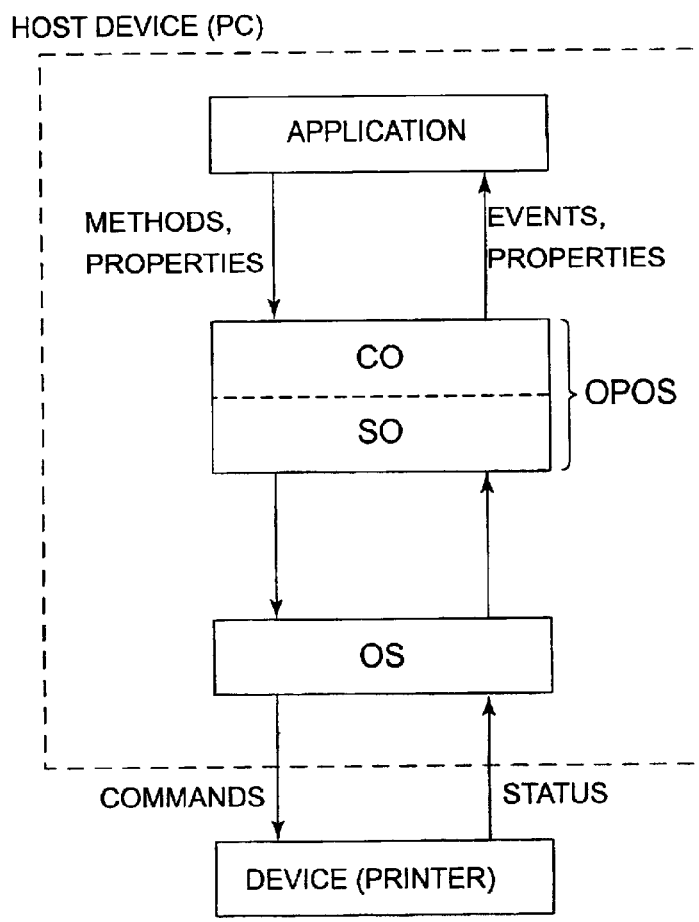
FIG. 9 shows the OPOS position in a POS system.

FIG. 9 illustrates the role (positioning) of OPOS objects in a POS system. As shown in FIG. 9 an OPOS object is software positioned between the operating system and the application program controlling POS system devices. OPOS objects standardize the interface between the host device (e.g., a PC) and the POS system device(s) based on a defined specification.

OPOS objects have two layers: a control object (CO) layer and service object (SO) layer. Control objects are objects provided for each device class, such as displays, and control interfacing with the application program. Service objects are objects provided at the device level, such as for a particular printer model, and enable the particular device to be controlled through the operating system. Service objects therefore contain information unique to the device. In the case of a printer, for example, service objects contain such information as the printer resolution, loaded fonts, and the number of printing columns. A service object can also read this unique information from the device as necessary.

An application program controls a particular device as desired using methods and properties. Results of device control can be obtained using events and properties.

An OPOS object converts process requests from the application program to the device to commands that are supported by the device, and receives process results from the device as status reports.

Figure 10:
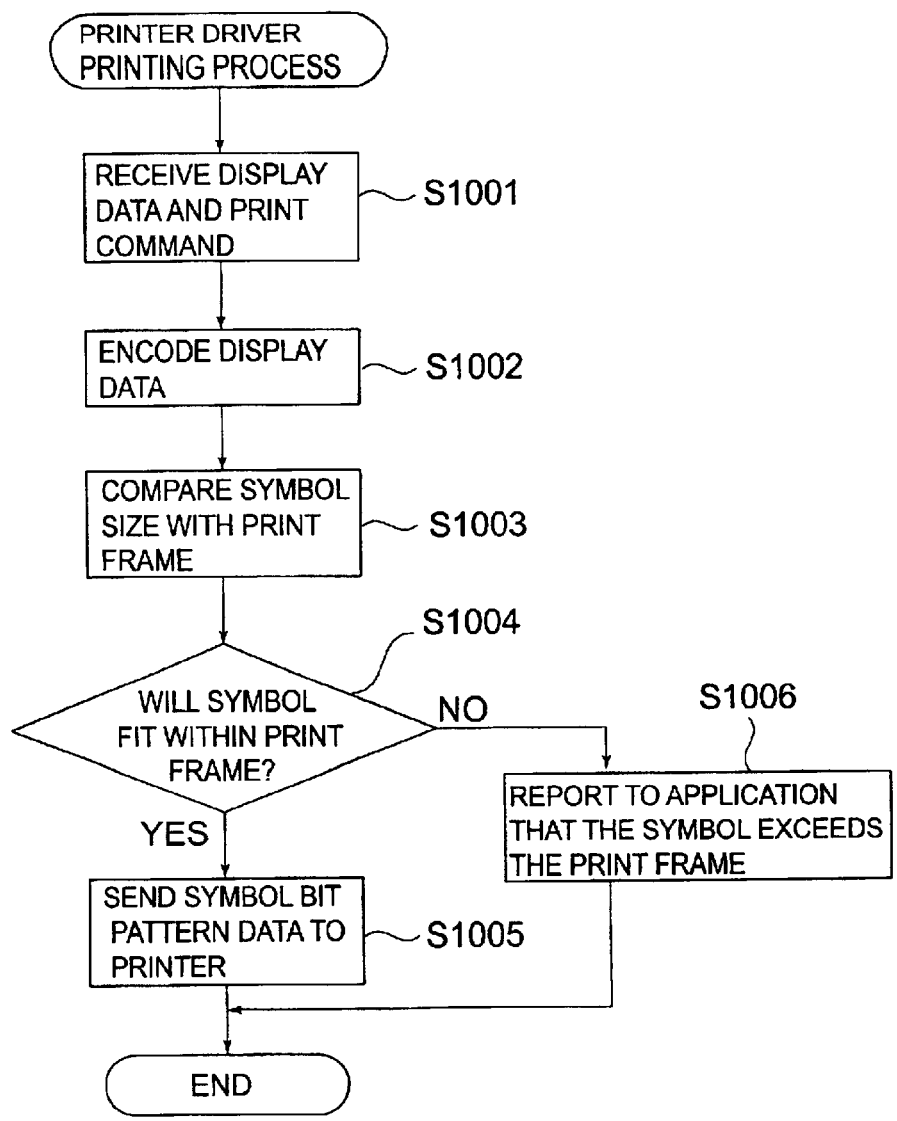
FIG. 10 is a flow chart of a symbol printing process in a printer driver according to the present invention.

A process for printing a PDF417 symbol using a printer driver is described next with reference to FIG. 10. It is assumed below that the application program sends a print symbol command and display data to the printer. The structure information has also already been set.

When a print symbol command and display data are received from the application program (step S1001), the OPOS object converts the display data to bit pattern data (step S1002). The OPOS object can be written so that structure definition information required by the conversion process is stored in a service object or stored to the printer and read therefrom as needed.

The size of the symbol converted to a bit pattern image is then compared with the defined print frame to determine whether the symbol can be printed within the printing frame (step S1003). As for the basic structure definition information, the print frame definition can be stored in a service object or stored to the printer and read therefrom as needed.

If printing within the printing frame is possible (step S1004 returns yes), the bit pattern image of the symbol is sent to the printer and printed (step S1005). If the symbol is larger than the defined printing frame (step S1004 returns no), the application program is notified (step S1006) and this process ends.

The same process can be applied when the display data is sent from the application program in conjunction with a report size information command.

By writing a device driver on the host side to handle the process for converting the information to be displayed to a bit pattern of the symbol to be printed, application development can be made easier.

It is also possible to effectively utilize the high processing power of the host device to shorten the processing time. It is further possible to reduce processing demands on the printer.

As described above, the present invention makes it possible to confirm symbol size without the application program performing the symbol conversion process because a printer or printer driver can return symbol size information in response to a request from an application program running on the host device.

While the invention has been described and illustrated in connection with specific embodiments, other alternatives, modifications, variations and applications will be apparent to those skilled in the art in light of the foregoing description. Thus, the invention is intended to embrace all such other alternatives, modifications, variations and applications as may fall within the spirit and scope of the appended claims.

What is claimed is:

1. A printer for printing a symbol encoding information, comprising:
   a first storage area for storing display data from which a symbol to be printed is generated;
   a symbol image generator for converting the display data stored in the first storage area to a specific symbol structure format, and generating from the specific symbol structure format bit pattern information representing the symbol to be printed;
   a second storage area for storing the bit pattern information;
   a calculator for calculating a horizontal symbol size and a vertical symbol size of the symbol to be printed from the bit pattern information;
   a size information transmitter for sending the horizontal and vertical symbol sizes calculated by the calculator to a host device as symbol size information; and
   a print controller for controlling printing of the bit pattern information of the symbol to be printed based on the symbol size information.

2. The printer of claim 1, wherein the symbol image generator comprises:
   a code converter for converting the display data to a code pattern according to a protocol of the symbol to be printed, and generating the specific symbol structure format; and
   a pattern generator for generating the bit pattern information of the symbol to be printed based on the specific symbol structure format.

3. The printer of claim 2, wherein the code converter, in converting the display data to a code pattern, compresses the coded display data, and includes error correction coding.

4. The printer of claim 1, wherein the symbol image generator generates an image of the symbol to be printed in response to a print request or a symbol size information send request from the host device.

5. The printer of claim 2, wherein the symbol image generator generates an image of the symbol to be printed in response to a print request or a symbol size information send request from the host device.

6. The printer of claim 3, wherein the symbol image generator generates an image of the symbol to be printed in response to a print request or a symbol size information send request from the host device.

7. The printer of claim 1, wherein the size information transmitter compares the size of the symbol to be printed with a specified printing area, and sends resulting comparison data to the host device.

8. The printer of claim 7, wherein the size information transmitter transmits the symbol size information or the comparison data, in response to print request or a symbol size information send request from the host device.

9. The printer of claim 8, wherein the print controller begins printing the symbol in response to a print request from the host device when the symbol size information or the comparison data indicates that the size of the symbol to be printed does not exceed the specified printing area.

10. The printer of claim 1, wherein the printer can print a stacked two-dimensional bar code including PDF417, SuperCode, and Ultracode symbologies, and a two-dimensional matrix code including VeriCode, Data Matrix, and MaxiCode symbologies.

11. A symbol printing method for printing a symbol from display data sent from a host device, said method comprising the steps of:
   (a) receiving the display data;
   (b) storing the received display data;
   (c) generating a specific code and format representing a symbol to be printed based on the received display data;
   (d) generating bit pattern information from the generated specific code;
   (e) transmitting to the host device in response to a request from the host device horizontal and vertical size information for the symbol to be printed; and
   (f) printing the bit pattern information of the symbol to be printed based on the horizontal and vertical size information.

12. The symbol printing method of claim 11, wherein step (c) comprises:
   (c1) converting the received display data to a symbol code, compressing the coded display data, and including an error correction code.

13. The symbol printing method of claim 11, wherein step (e) comprises:
   (e1) comparing the size of the symbol to be printed with a specified printing area, and sending resulting comparison data to the host device.

14. The symbol printing method of claim 13, wherein step (f) is performed in response to a print request from the host device when the comparison data indicates the size of the symbol to be printed does not exceed the specified printing area.

15. The symbol printing method of claim 11, wherein steps (c) to (e) are performed in response to a size information send request from the host device.

16. The symbol printing method of claim 12, wherein steps (c) to (e) are performed in response to a size information send request from the host device.

17. The symbol printing method of claim 13, wherein steps (c) to (e) are performed in response to a size information send request from the host device.

18. The symbol printing method of claim 11, wherein steps (c) to (f) are performed in response to a print request from the host device.

19. The symbol printing method of claim 12, wherein steps (c) to (f) are performed in response to a print request from the host device.

20. The symbol printing method of claim 13, wherein steps (c) to (f) are performed in response to a print request from the host device.

21. The symbol printing method of claim 11, wherein the symbol printing method is a method for printing a two-dimensional code including a stacked two-dimensional code, including PDF417, SuperCode, and Ultracode symbologies, and a two-dimensional matrix bar code including VeriCode, Data Matrix, and MaxiCode symbologies.

22. A machine-readable storage medium containing a program of instructions for printing as a symbol data sent from a host device, said program of instructions comprising:

(a) receiving the display data;

(b) storing the received display data;

(c) generating a specific code and format representing a symbol to be printed based on the received display data;

(d) generating bit pattern information from the generated specific code;

(e) transmitting to the host device in response to a request from the host device horizontal and vertical size information for the symbol to be printed; and (f) printing the bit pattern information of the symbol to be printed based on the horizontal and vertical size information.

23. The machine-readable storage medium of claim 22, wherein step (c) comprises:

(c1) converting the received display data to a symbol code, compressing the coded display data, and including an error correction code.

24. The machine-readable storage medium of claim 22, wherein step (e) comprises:

(e1) comparing the size of the symbol to be printed with a specified printing area, and sending resulting comparison data to the host device.

25. The machine-readable storage medium of claim 24, wherein step (f) is performed in response to a print request from the host device when the comparison data indicates the size of the symbol to be printed does not exceed the specified printing area.

26. The machine-readable storage medium of claim 22, wherein steps (c) to (e) are performed in response to a size information send request from the host device.

27. The machine-readable storage medium of claim 23, wherein steps (c) to (e) are performed in response to a size information send request from the host device.

28. The machine-readable storage medium of claim 24, wherein steps (c) to (e) are performed in response to a size information send request from the host device.

29. The machine-readable storage medium of claim 22, wherein steps (c) to (f) are performed in response to a print request from the host device.

30. The machine-readable storage medium of claim 23, wherein steps (c) to (f) are performed in response to a print request from the host device.

31. The machine-readable storage medium of claim 24, wherein steps (c) to (f) are performed in response to a print request from the host device.

32. The machine-readable storage medium of claim 22, wherein the symbol printing method is a method for printing a two-dimensional code including a stacked two-dimensional code, including PDF417, SuperCode, and Ultracode symbologies, and a two-dimensional matrix bar code including VeriCode, Data Matrix, and MaxiCode symbologies.

33. A printer driver, operably positioned between an application program running on a host device and a printer in communication with the host device, for controlling the printer based on a request from the application program, said printer driver comprising:

means for receiving display data from the application program;

symbol image generating means for generating from the received display data a specific format representing a symbol to be printed, and converting the specific format to bit pattern information representing the symbol;

means for calculating a horizontal symbol size and vertical symbol size from the bit pattern information;

size information transmission means for sending the calculated horizontal and vertical symbol sizes to the application program as symbol size information; and print data transmission means for sending to the printer the bit pattern information of the symbol to be printed based on the symbol size information.

34. The printer driver of claim 33, wherein the printer driver comprises an OPOS object having a first object that provides an interface to the application program, and a second object that provides the first object with an interface to the printer.

35. The printer driver of claim 34, wherein the first object comprises the receiving means and the size information transmission means, and the second object comprises the symbol image generating means, calculating means, and print data transmission means.

36. A machine-readable storage medium containing a program of instructions for implementing the printer driver of claim 33.

37. The machine-readable storage medium containing a program of instructions for implementing the printer driver of claim 34.

38. The machine-readable storage medium containing a program of instructions for implementing the printer driver of claim 35.

* * * * *

UNITED STATES PATENT AND TRADEMARK OFFICE
CERTIFICATE OF CORRECTION

PATENT NO.   : 6,906,812 B2
DATED        : June 14, 2005
INVENTOR(S)  : Naohiko Koakutsu et al.

It is certified that error appears in the above-identified patent and that said Letters Patent is hereby corrected as shown below:

<u>Title page,</u>
Item [*] Notice, delete "This patent is subject to a terminal disclaimer.".

Signed and Sealed this

Fourth Day of April, 2006

JON W. DUDAS
*Director of the United States Patent and Trademark Office*